United States Patent
Lee et al.

(10) Patent No.: US 6,288,808 B1
(45) Date of Patent: Sep. 11, 2001

(54) LARGE CAPACITY OPTICAL ATM SWITCH

(75) Inventors: Sang Goo Lee; Kyeong Mo Yoon; Su Mi Chang; Jin Sik Park; Yong Ki Park; Jin Seob Eom; Kwang Bok Kim; Sang Ho Ahn; Ki O Park, all of Taejeon (KR)

(73) Assignee: Korea Telecommunication Authority, Hyunggi-do (KR)

( * ) Notice: Subject to any disclaimer, the term of this patent is extended or adjusted under 35 U.S.C. 154(b) by 0 days.

(21) Appl. No.: 09/213,292

(22) Filed: Dec. 14, 1998

(30) Foreign Application Priority Data

Dec. 15, 1997 (KR) .................................................. 97-68807

(51) Int. Cl.$^7$ .............................. H04J 14/00; H04J 14/08
(52) U.S. Cl. ........................... 359/123; 359/117; 359/135
(58) Field of Search ..................... 359/117, 123, 359/128, 130, 135, 139

(56) References Cited

U.S. PATENT DOCUMENTS

| | | | |
|---|---|---|---|
| 4,797,879 | * 1/1989 | Habbab et al. | 370/3 |
| 5,005,166 | * 4/1991 | Suzuki et al. | 370/1 |
| 5,208,691 | * 5/1993 | Nishio | 359/123 |
| 5,450,225 | 9/1995 | Bostica et al. | 359/159 |
| 5,506,712 | 4/1996 | Sasayama et al. | 359/123 |
| 5,623,356 | * 4/1997 | Kaminow et al. | 359/123 |
| 5,841,556 | * 11/1998 | Hong et al. | 359/117 |

* cited by examiner

Primary Examiner—Leslie Pascal
Assistant Examiner—Dalzid Singh
(74) Attorney, Agent, or Firm—Merchant & Gould P.C.

(57) ABSTRACT

An optical asynchronous transfer mode ATM switch for recovering the limitation of processing capacity and performing large capacity of switching is disclosed. The ATM switch includes wavelength division multiplexing/time division multiplexing conversion modules for demultiplexing wavelength multiplexed optical channels through transmission links of respective input terminals of a switch to convert them into a primary wavelength for routing to their respective channels and compressing to time division multiplexing for preventing collision between cells, a first router for routing the respective cells which are converted into a primary wavelength by the wavelength division multiplexing/time division multiplexing conversion modules to assign the first destination, time division multiplexing/wavelength division multiplexing conversion modules for demultiplexing the channel signals routed by the first router, decompressing into original signals to convert them into wavelength to be routed for final destination and compressing them again to prevent collision between cells, and second routers for routing the decompressed signals from the time division multiplexing/wavelength division multiplexing conversion modules to the final destination.

2 Claims, 9 Drawing Sheets

LARGE CAPACITY OPTICAL ATM SWITCH

BACKGROUND OF THE INVENTION

1. Field of the Invention

The present invention relates to a large capacity optical asynchronous transfer mode (ATM) switch, and more particularly to a large capacity optical ATM switch in which the limited capacity of the switch is recovered and large capacity switching can be achieved.

2. Background of Related Art

As for the optical exchange methods, space division multiplexing (SDM), time division multiplexing (TDM), wavelength division multiplexing (WDM) and free-space method have been suggested, each having their advantages and disadvantages. As for the optical ATM in which electric routing is not performed, star coupler type cell routing method is first suggested in Bellcore, and other most ATMs are controlled electrically while high-speed optical bandwidth switching is controlled by optical techniques. Typical examples of such a system are the optical packet exchange system, suggested by NEC, the ultra fast photonic ATM system of NTT, and the space division switch of Hitachi. Recently, frequency routing type time division interconnection network FRONTIERNET of NTT has been disclosed in the academic field of the switch. In the ULPHA switching system (Journal of Lightwave Technology, Vol 10, No. 2, February 1992), as an example, a time division switch system includes n input/output channels 1 as shown in FIG. 1. Electric or optical signals are transmitted to each channel. Each channel is inputted to an input interface module 2. Cells are recovered to remove phase jitter and inserted into time slots which are synchronized by system clocks. Simultaneously, a laser diode 3 which is accommodated in the system is synchronized with the system clock to make ultra high-speed optical signals split to respective cell coders 4 by a coupler 5.

The cells which are inputted to the cell coders 4 are divided into an address part and a data part to be modulated into different wavelengths respectively. At this time, if pulse rows of the laser diode 3 which is synchronized to the master clock of the system are inputted to an external modulator, each channel data are changed into electric signals to modulate the external modulator. In order to prevent cell collision due to the same wavelength which may possibly occur between cells during the exchange, the pulse rows which are outputted from the modulator are compressed by a rate T/n which is obtained by dividing a cell period T with a whole channel number n.

The respective compressed cells are subject to different fiber delays and cells which are inputted to a star coupler 6 become time multiplexed. The cells, which are inputted to the star coupler 6, distributes power to their output terminals, and the address of the compressed cells are detected respectively in the output terminals, so that an optical selector 7 is operated to output only desired cells to the next terminal stage. If the cells of all input ports are to be transmitted to one output terminal, since the total channel number n of compressed cells resides in the original cell period T, these compressed cells are decompressed into an original transmission signal for reception, thereby causing cell collision. For this reason, cell buffers 8 are provided for outputting only one compressed cell to a next terminal per a period T. Cell coders 9 decompress the compressed cells into the original transmission signals in order to transmit them into next optical links or a final receiver after converting them into electric signals. That is, the ULPHA switching system distributes optical power to all output terminals by using the star coupler 6. Therefore, when the system is expanded to increase processing capacity, the optical power which is received by respective receiver terminals is decreased relative to the number of links. Further, if the system is expanded in the time division configuration, the compression required in the cell coder 4 of respective links are also proportionally increased, so that large capacity can not be achieved.

Furthermore, the multi-terminal switching system (Journal of lightwave technology, Vol. 15, No. 3, March 1997) of the FRONTIERNET which has been suggested by NTT, as shown in FIG. 2, includes M×N frequency converters 10, N+M frequency routers FR 11, M×N frequency switches 12, and K×M frequency division multiplexing FDM output buffers 13. Respective input and output terminal links 14 are to be either a transmission line which is frequency division multiplexed or a transmission line which is time division multiplexed, wherein the present invention corresponds to the latter. It is assumed that frequencies of the cell header and payload are different. For example, in case of a channel of the input link, ATM cell which is inputted to the frequency converter 10 is separated into a data part and a header part by a demultiplexer 15 and converted into electric signals of frequency assignment signals by an optical/electron converter 16. A frequency for routing is selected from header information of the electric signal, and a continuous beam of a tunable wavelength converter 17, which is oscillated by a selected frequency, is inputted to an external modulator 18 to be modulated by the first input data signal. Frequency converted cell for routing is inputted to a frequency switch module 19 of destination link by the frequency router 11. In the multi-terminal switching system, when the system is expanded to increase processing capacity, a frequency required for routing at one input link has twice the number of input channels and output links. If all channels of a cell are inputted by the frequency switch 12 of one output link, the cell is selected by k frequency selectors 20 and distributed by a splitter 21. The frequency selector 20 selects only one desired frequency and the selected frequency is converted by a frequency converter 22 to be routed to a final destination. In the worst case where all the channels of the input terminals goes to one destination, the bottle-neck phenomenon occurs. As a result, a large capacity frequency division multiplexing output buffer 13 is required to prevent the bottle-neck phenomenon.

As described hereinabove, in order to realize a large capacity optical switching system, numerous hardwares are required and accordingly variable range of the optical frequency for routing needs to be expanded. However, in view of plane gain bandwidth, the frequency interval is to be finely divided, so that it requires high leveled techniques for maintaining high frequency stability, wherein the manufacturing cost increases.

Furthermore, both switching systems have disadvantages that high leveled techniques are required, and high hardware requirement for increasing the processing capacity, which, accordingly, increases the manufacturing cost.

SUMMARY OF THE INVENTION

Accordingly, the present invention is directed to a large capacity optical ATM switch that substantially obviates one or more of the problems due to limitations and disadvantages of the related art.

An object of the present invention is to provide a large capacity optical ATM switch which reduces the number of required hardware while improving the switching capacity, thereby reducing the manufacturing cost.

To achieve the objects and in accordance with the purposes of the invention, as embodied and broadly described herein, a large capacity optical ATM switch includes wavelength division multiplexing/time division multiplexing conversion modules for demultiplexing wavelength multiplexed optical channels through transmission links of respective input terminals of a switch to convert them into a primary wavelength for routing their respective channels and compressing to the time division multiplexing so as to prevent collision between cells, a first router for routing the respective cells which are converted into a primary wavelength by the wavelength division multiplexing/time division multiplexing conversion modules to assign a first destination, time division multiplexing/wavelength division multiplexing hybrid switching modules for demultiplexing the channel signals routed by the first router, decompressing the routed channel signals into original signals to convert them into wavelength to be routed for final destination and compressing them again to prevent cell collision, and second routers for routing the decompressed signals from the time division multiplexing/wavelength division multiplexing conversion modules to the final destination.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
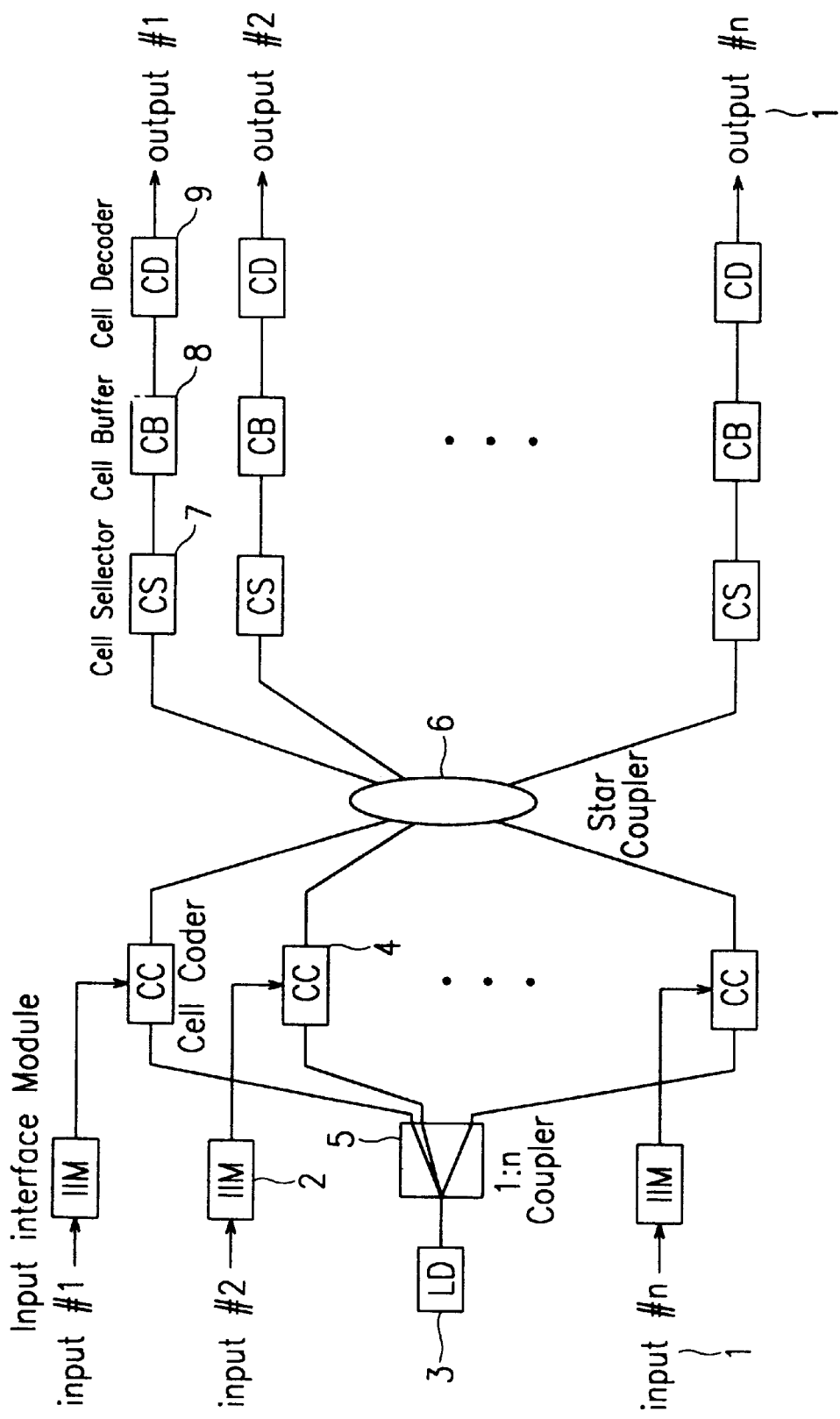
FIG. 1 shows the configuration of a conventional ULPHA switch.
Figure 2:
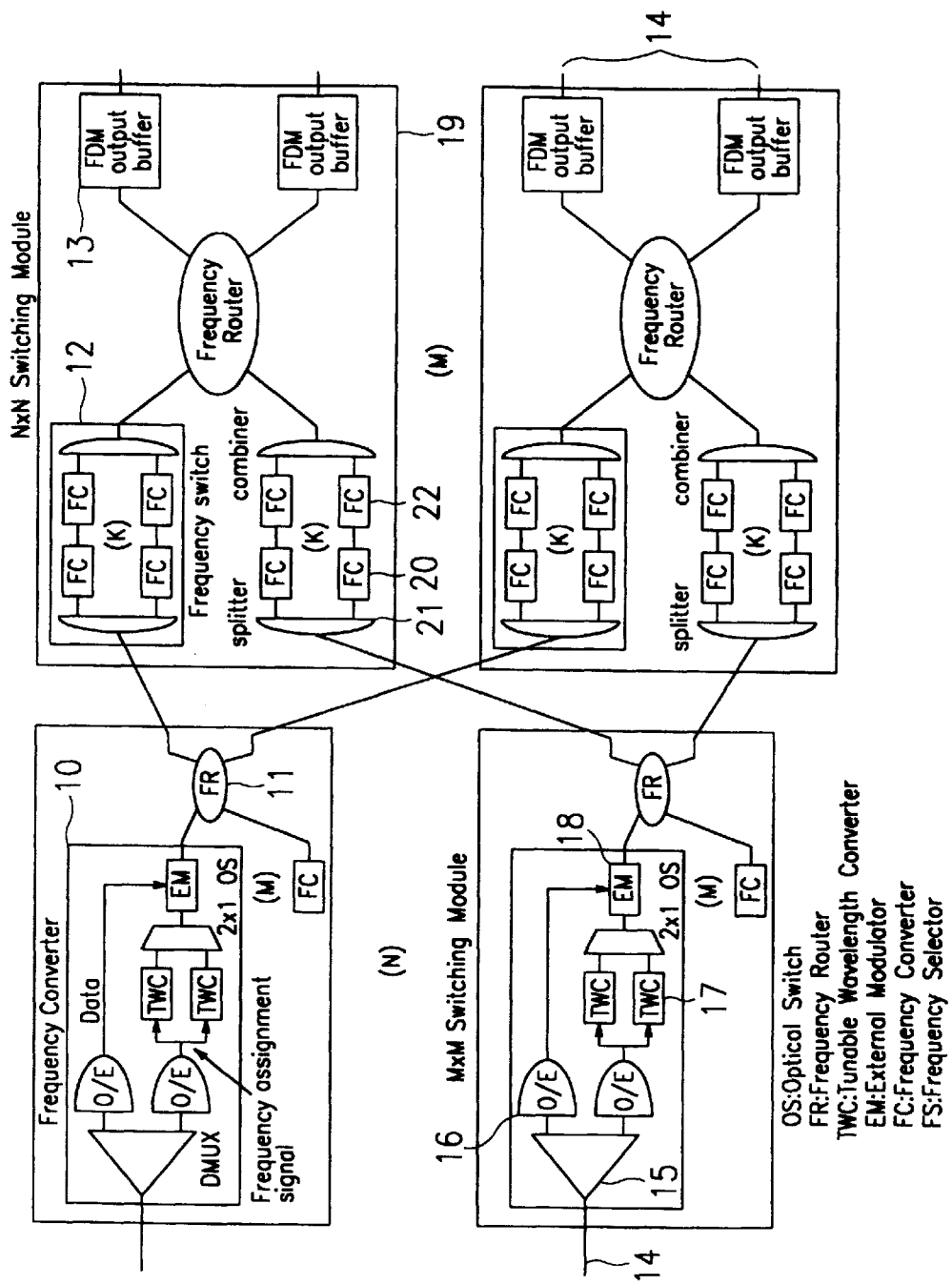
FIG. 2 shows the configuration of a conventional FRONTIERNET.
Figure 3:
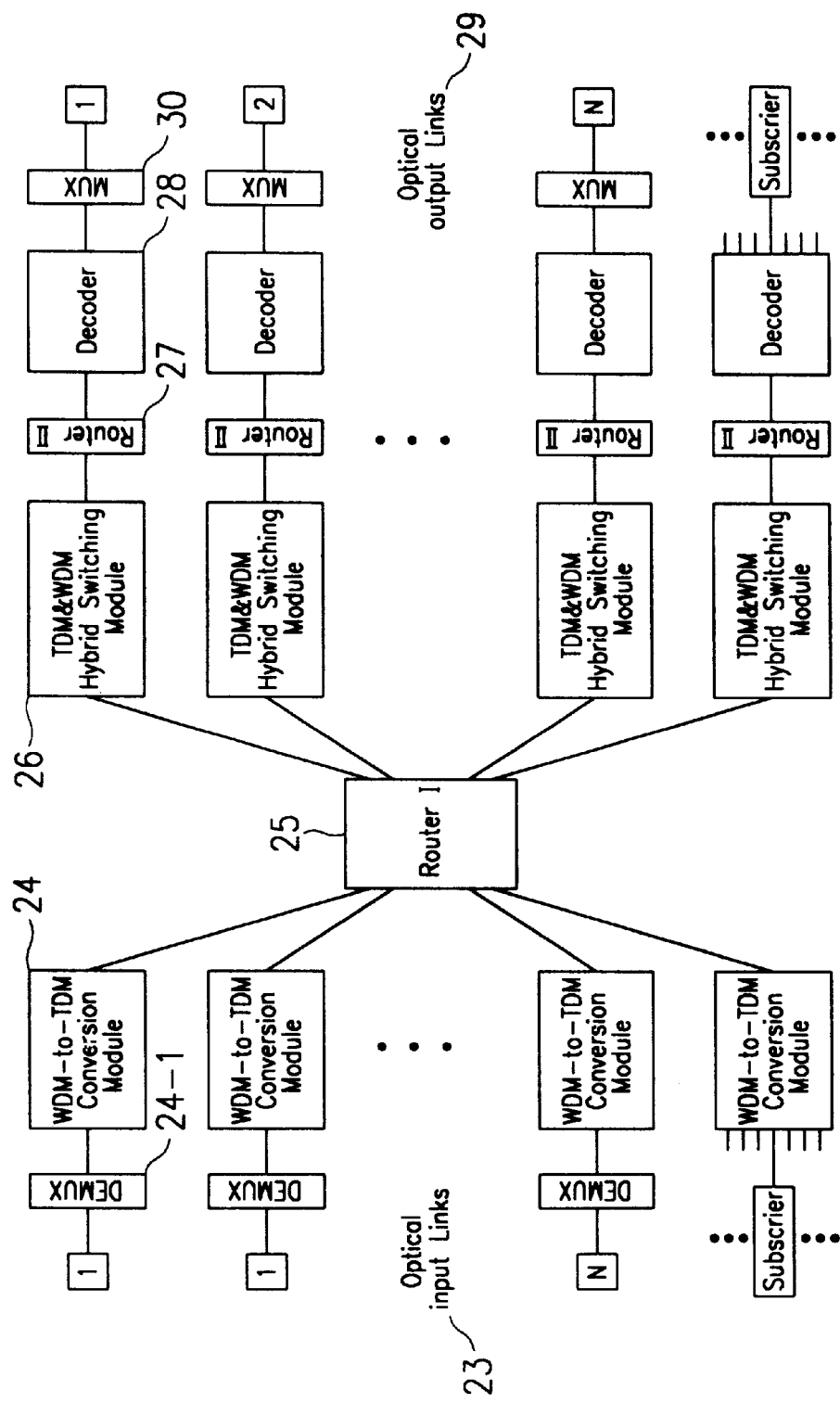
FIG. 3 shows the whole configuration of the large capacity optical ATM switch according to an embodiment of the present invention.

Reference will now be made in detail to the preferred embodiment of the present invention, example of which is illustrated in FIG. 3.

FIG. 3 shows the whole configuration of the large capacity optical ATM switch according to an embodiment of the present invention.

Referring to FIG. 3, the preferred embodiment of a large capacity optical ATM switch includes a demultiplexer DEMUX 24-1 for demultiplexing wavelength multiplexed optical channels by transmission links 23 of their respective input terminals of the switch, wavelength division multiplexing/time division multiplexing WDM-to-TDM conversion modules 24 for demultiplexing the multiplexed signals from the demultiplexers DEMUX 24-1 into a primary wavelength for routing to respective channels and compressing them for time division multiplexing so as to prevent collision between cells, a first router 25 for routing the respective cells which are converted into a primary wavelength by the wavelength division multiplexing/time division multiplexing conversion modules 24 to assign a first destination, time division multiplexing/wavelength division multiplexing hybrid switching modules 26 for demultiplexing the channel signals routed by the first router 25, decompressing the routed channel signals into original signals to convert them into wavelength to be routed for a final destination and to compress them again to prevent collision between cells, second routers 27 for routing the decompressed signals from the time division multiplexing/ wavelength division multiplexing hybrid switching modules 26 to the final destination, decoders 28 for reading the routed cells from the second routers, and multiplexers 30 for multiplexing the read cells from the decoders 28 to transmit them to respective output transmission links of the switch.

Figure 4:
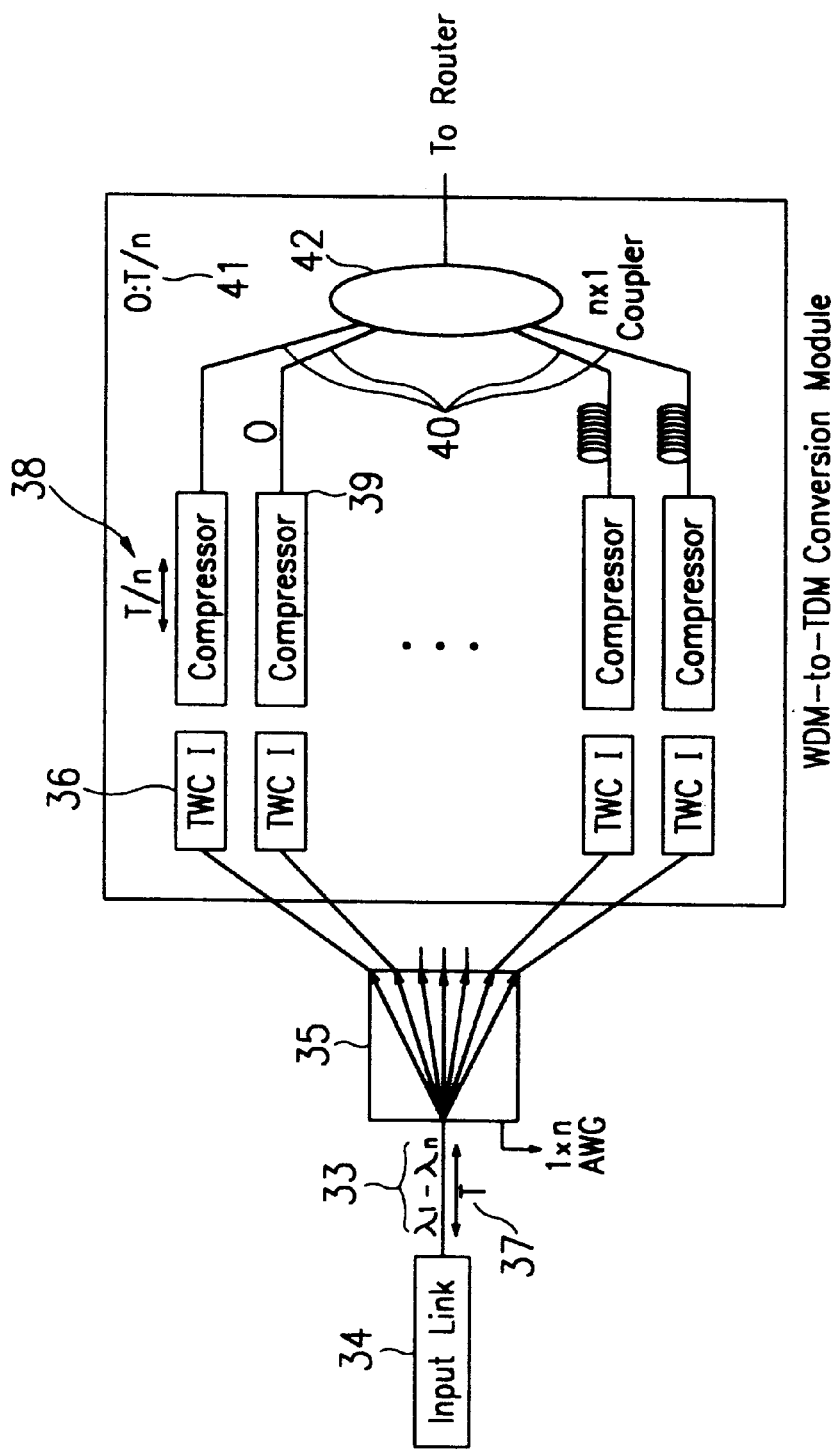
FIG. 4 shows the configuration of a WDM-to-TDM conversion module of the large capacity optical ATM switch according to the present invention.
Figure 5:
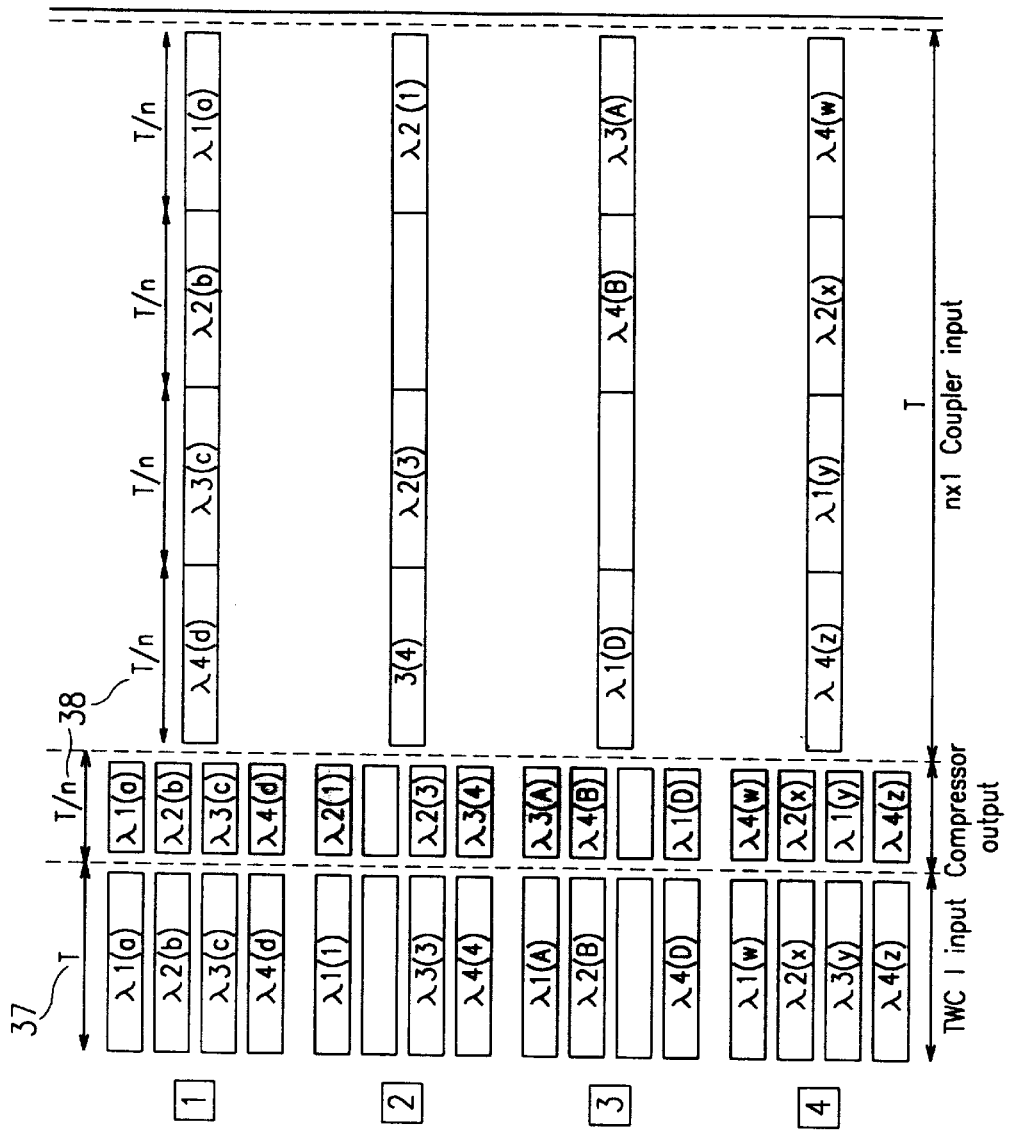
FIG. 5 shows a timing chart of the WDM-to-TDM conversion module of the large capacity optical ATM switch according to the present invention.

FIG. 4 shows the configuration of the WDM-to-TDM conversion module of a large capacity optical ATM switch according to the present invention, and FIG. 5 shows a timing chart of the WDM-to-TDM conversion module of a large capacity optical ATM switch according to the present invention. Referring to FIG. 4 and FIG. 5, if it is assumed that the transmission link is wavelength division multiplexed into n wavelength ($\lambda 1$–$\lambda n$) 33 in order to increase the transmission efficiency, channels which are inputted to their respective input links 34 are demultiplexed by the demultiplexer 24-1, wherein 1×n arrayed waveguide grating AWG 35 is adapted for carrying out the demultiplexing function. If the input terminal is not an inputted to link 23 but rather to the subscriber, the channels are directly connected to the wavelength division multiplexing/time division multiplexing WDM-to-TDM conversion modules 24 without using the demultiplexer 24-1. The n demultiplexed channels 33, which are different from each other, are converted into wavelength to be routed to destination links by tunable wavelength convertors TWC I 36. It is possible that some of the n channels have a same destination link. If, in the worst case scenario, all the n channels have a same destination link, they are converted into a same wavelength by the tunable wavelength convertors 36, so that collision may occur between cells while being inputted to the first router 25. In order to prevent the occurrence of this case, respective cells are compressed to T/n by compressors 39 to allow all the n channels 33 to be time division multiplexed into one cell period T 37. The respective compressed cells pass through delay lines 40 having a difference of T/n 41 delay length and coupled by a n×1 coupler 42. In conclusion, n primary wavelength multiplexed channels 33, which are subjected to all the above steps, are inputted to the first router 25 after being time division multiplexed in one cell period T 37.

Figure 6:
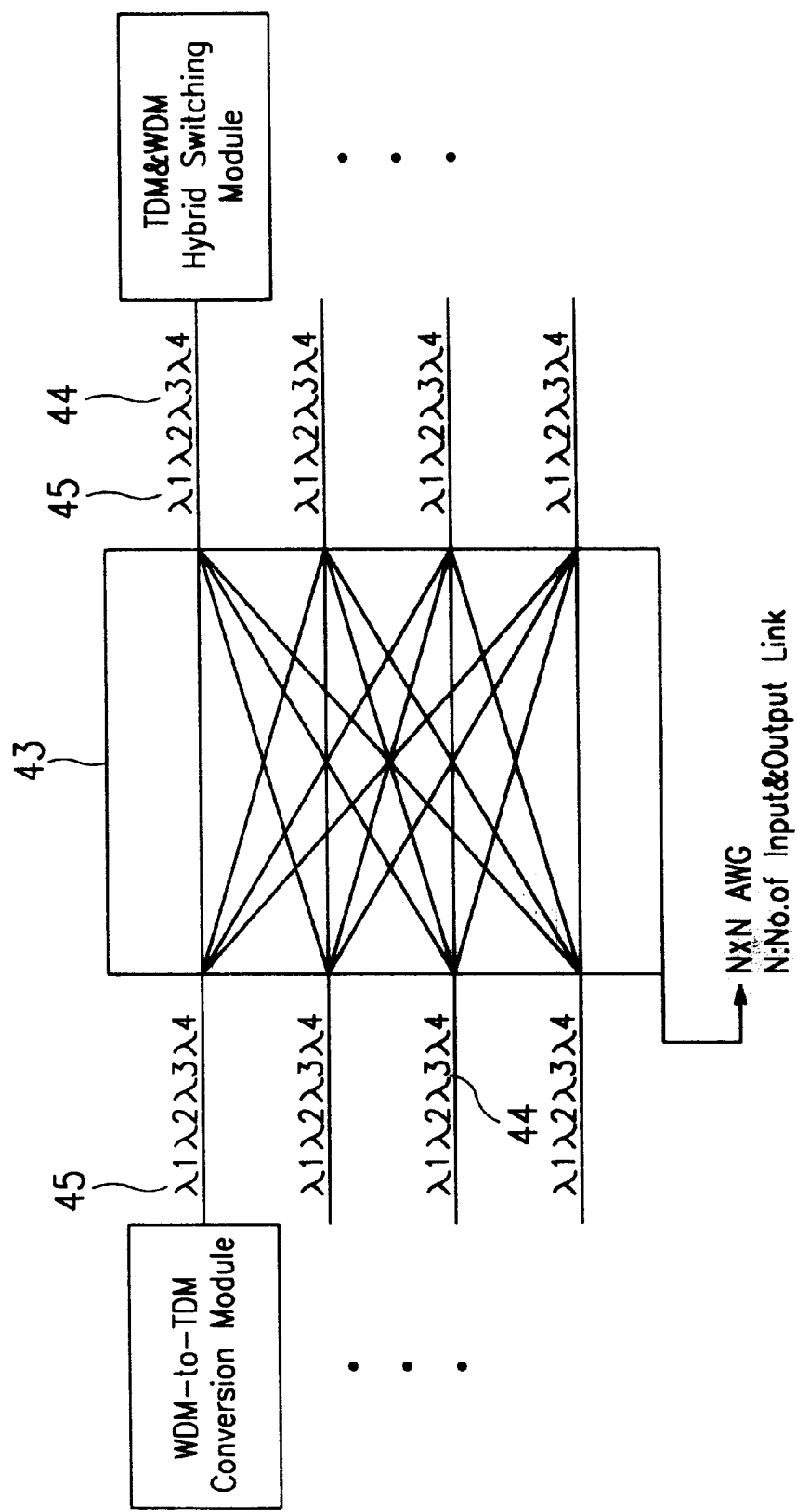
FIG. 6 shows a first router of the large capacity optical ATM switch according to an embodiment of the present invention.

FIG. 6 shows the first router of the large capacity optical ATM switch according to an embodiment of the present invention, wherein an example of routing of its 4 input and output links by using an arrayed waveguide grating AWG 43 are shown. As for an algorithm for channel routing according to wavelength in the arrayed waveguide grating AWG 43, if it is assumed that the input terminal 23 in one link is I, output terminal 30 is j and the numbers of the input and output terminals are N, wavelength of respective cells are determined by the formula $\{(I+j-2) \bmod N\}+1$. For example, if the number of the input and the output terminals are 4 in FIG. 6 and a cell which is inputted through an input terminal 3 is to be switched to an output terminal 3, the cell is converted into a wavelength $\{(3+1-2) \bmod N\}+1=3$, that is $\lambda_3$ (44). If a cell from an input terminal 1 is to be switched to an output terminal 1 simultaneously, the cell is converted into a wavelength $\{(1+1-2) \bmod N\}=1$, that is $\lambda_1$ (45) to be switched to a first output terminal. In the arrayed waveguide grating AWG 43, if channels of the same wavelength have different input ports, output ports thereof become different, and different wavelengths are required to transmit signals from different input ports to a same output port. Therefore, an output port of the arrayed waveguide grating AWG 43 may have wavelength multiplexed signals from several input ports and there is no collision between the signals. That is, cells of respective input terminals, which are time multiplexed by the wavelength division multiplexing/time division multiplexing WDM-to-TDM conversion modules 24, pass through the arrayed waveguide grating AWG 43 and cells towards a same destination are wavelength multiplexed in a same time slot. The cells, which are simultaneously multiplexed by wavelength and time, are inputted to the time division multiplexing/wavelength division multiplexing hybrid switching modules 26. The routing method carrying out the wavelength and time multiplexing simultaneously requires much less optical power than the conventional routing method in the prior art's switch structures and has an advantage of reducing the number of wavelength for routing.

Figure 7:
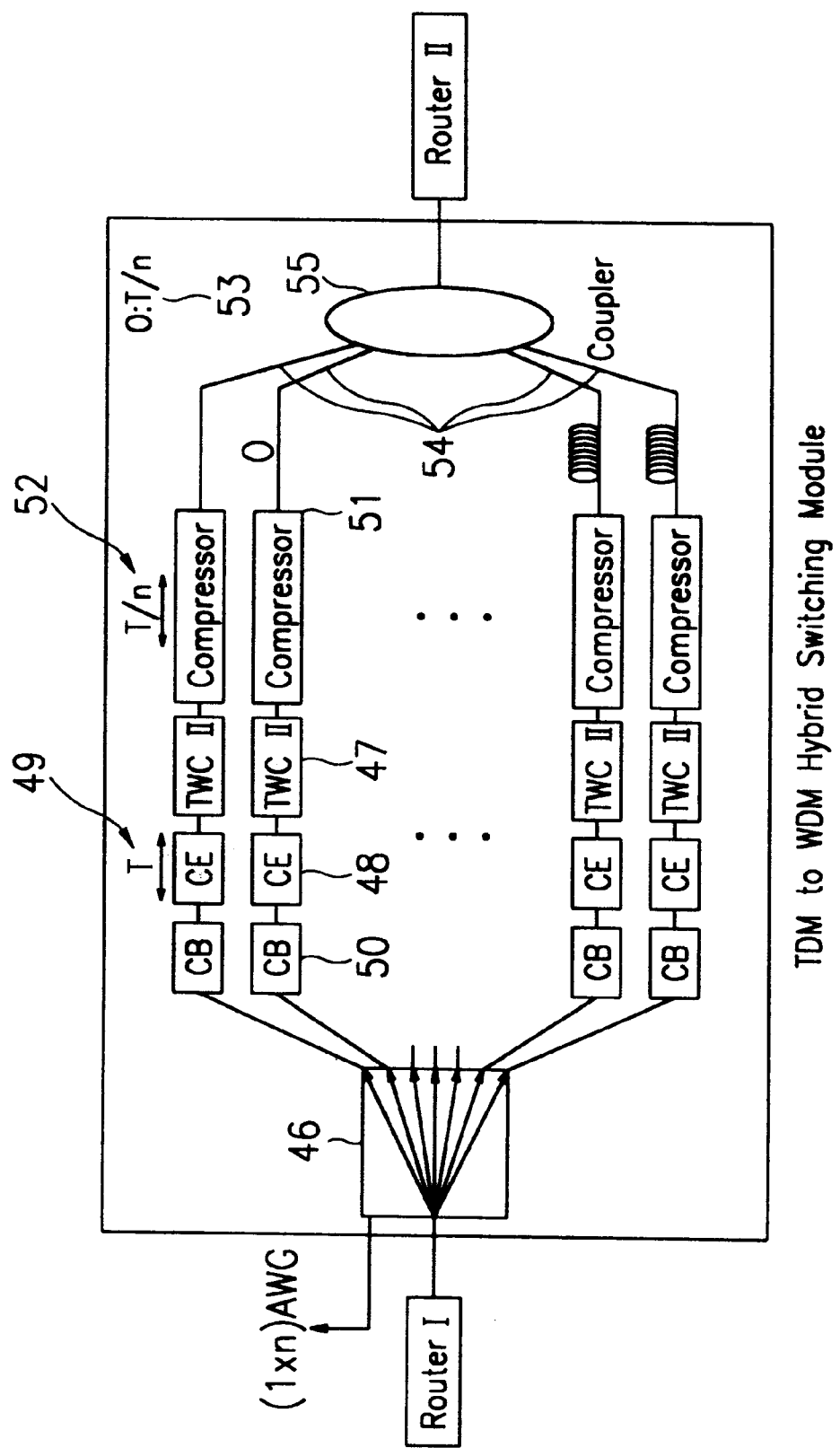
FIG. 7 shows the configuration of a TDM-to-WDM hybrid switching module of the large capacity optical ATM switch according to the present invention.
Figure 8:
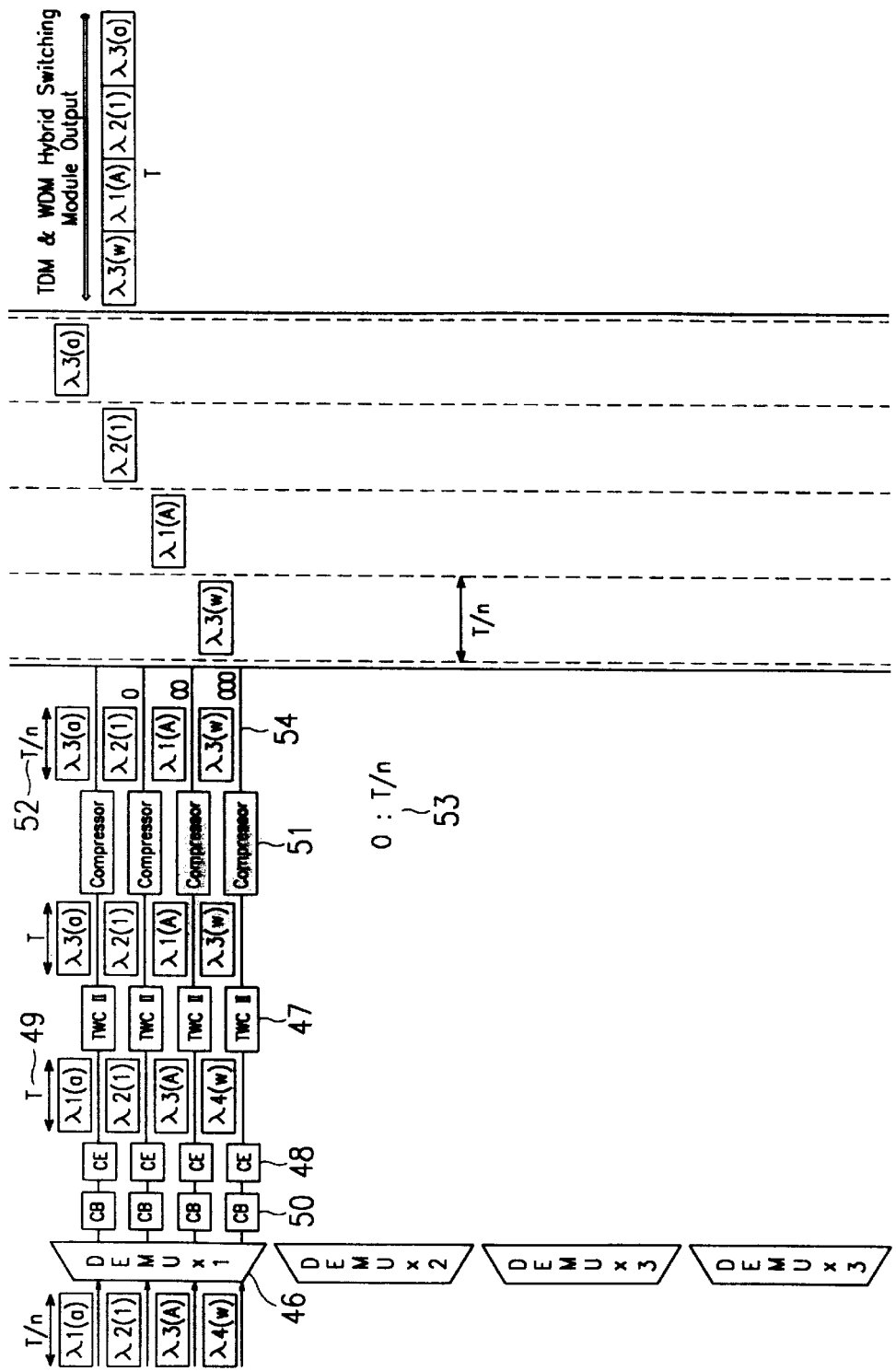
FIG. 8 shows a timing chart of the WDM-to-TDM hybrid switching module of the large capacity optical ATM switch according to the present invention.

FIG. 7 shows the configuration of a TDM-to-WDM hybrid switching module of the large capacity optical ATM switch according to the present invention, and FIG. 8 shows a timing chart of the WDM-to-TDM hybrid switching module of a large capacity optical ATM switch according to the present invention.

Referring to FIG. 7 and FIG. 8, the time division multiplexing/wavelength division multiplexing hybrid switching modules 26 carry out wavelength demultiplexing by means of a 1×n arrayed waveguide grating AWG 46 similarly to the wavelength division multiplexing/time division multiplexing WDM-to-TDM conversion modules 24. The respective demultiplexed cells are converted into wavelength to be routed to a final destination. In a high speed ATM cell, 10 channels, of which transmission speed at the transmission link is 10 Gbps, are multiplexed, since the cell is compressed by a T/n compressor 38 in the wavelength division multiplexing/time division multiplexing WDM-to-TDM conversion modules 24, a bit rate of the compressed ATM cell becomes 100 Gbit/s. It is difficult to directly modulate a laser diode LD at the speed of 100 Gbit/s with the current techniques, the speed must be adjusted into 10 Gbit/s, the highest speed which may be modulated with the current techniques in the art. For this reason, the speed is decompressed to the period T 49, that is, the original transmission speed by means of cell decompressors 48 provided in front of the tunable wavelength converters 47 for increasing an interval between bits. However, since n cells compressed by the T/n compressor 38 may be in the T period 49, it is possible for a cell to collide with the next cell during its decompression. Therefore, cell buffers SO are provided to output the respective cells to the cell decompressor 48 by the T period 49 in order to prevent the bottle-neck phenomenon causing the collision between the decompressed cell with the next cell. If a first channel transmission speed is tens or hundreds Mbps, or a wavelength modulation technique capable of processing 100 Gbit/s signals is developed, the cell buffers 50, cell decompressors 48 and the cell compressors 51 are not necessary any more.

Considering the maximum n cells which are wavelength converted by tunable wavelength converters II (47), if the n cells switched to the same destination, cell collision is unavoidable at an output terminal of the time division multiplexing/wavelength division multiplexing WDM-to-TDM hybrid switching modules 26, so that the cells are compressed by T/n compressors 52 in the same way with the wavelength division multiplexing/time division multiplexing WDM-to-TDM conversion modules 24. Then, the cells pass through the fiber delay lines 54 having different delay lengths T/n 53 respectively, to be coupled by the nx1 coupler 55. In conclusion, the cells which are outputted from the time division multiplexing/wavelength division multiplexing WDM-to-TDM hybrid switching modules 26 are in the time division multiplexed state similarly to the output from the wavelength division multiplexing/time division multiplexing WDM-to-TDM conversion modules 24. The algorithm for routing is as described hereinabove, and the tunable wavelength converters II 47 may utilize the same tunable wavelength range as required by the tunable wavelength converters 47 of the wavelength division multiplexing/time division multiplexing WDM-to-TDM conversion modules 24.

Figure 9:
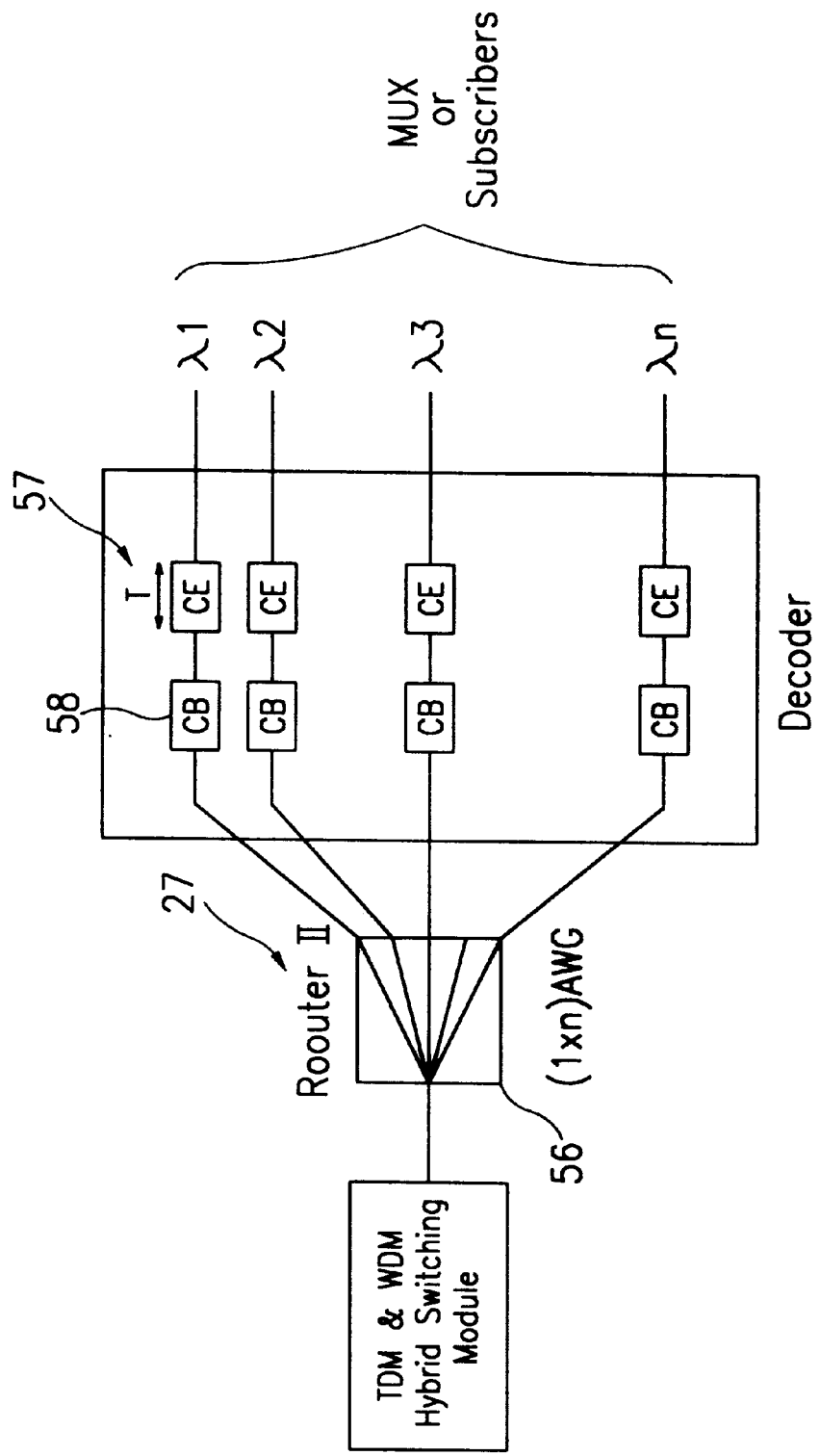
FIG. 9 shows the configuration of a second router and a decoder of the large capacity optical ATM switch according to the present invention.

FIG. 9 shows the configuration of the second router and the decoder of the large capacity optical ATM switch according to the present invention, wherein the time division multiplexed cells which are outputted from the time division multiplexing/wavelength division multiplexing WDM-to-TDM hybrid switching modules 26 are demultiplexed by the second router II 27 by wavelengths by means of 1×n arrayed waveguide grating 56. This method has an advantage that much more gain of optical power can be obtained comparing to the routing process of the ULPHA switch configuration or the FRONTIERNET switch configuration.

Therefore, the cells, which are compressed by the T/n compressors 52 for preventing the cell collision during the routing, are decompressed into their original period T 57, wherein the cell buffers 58 are provided to prevent the bottle-neck phenomenon in the same manner as the time division multiplexing/wavelength division multiplexing WDM-to-TDM hybrid switching modules 26. If the output terminal of the switch is a subscriber, the optical/electron conversion is performed. If the output terminal is not the final destination but next transmission link, cells are multiplexed into n channels by means of the multiplexers MUX 30 to transmit them by the original wavelength multiplexing method.

As aforementioned, the large capacity optical ATM switch according to the present invention has the following advantages. Since the wavelength division method and the time division method are both utilized, the number of hardware is considerably reduced comparing to the prior art configurations and accordingly the manufacturing cost is reduced significantly.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. In an optical ATM switch having wavelength multiplexed input and output terminals, a large capacity wavelength division multiplexing optical ATM switch comprising:

wavelength division multiplexing/time division multiplexing conversion modules for demultiplexing wavelength multiplexed optical channels through transmission links of respective input terminals of a switch to convert them into a primary wavelength for routing to the respective channels and compressing to time division multiplexing for preventing collision between cells;

a first router for routing the respective cells which are converted into a primary wavelength by the wavelength division multiplexing/time division multiplexing conversion modules to assign a first destination;

time division multiplexing/wavelength division multiplexing conversion modules for demultiplexing the channel signals routed by the first router, and decompressing the routed channel signals into original signals to convert them into wavelength to be routed for final destination and compressing them again to prevent collision between cells; and second routers for routing the decompressed signals from the time division multiplexing/wavelength division multiplexing conversion modules to the final destination.

2. The switch as claimed in claim 1, wherein said wavelength division multiplexing/time division multiplexing conversion modules comprises tunable wavelength converters I, T/n compressors for compressing cells and converting time division multiplexed signals to prevent collision between cells, T/n optical fiber delay lines, and n×1 coupler.

* * * * *